A. DJIDICS.
NURLING DEVICE.
APPLICATION FILED NOV. 8, 1919.
1,365,386.
Patented Jan. 11, 1921.
2 SHEETS—SHEET 1.
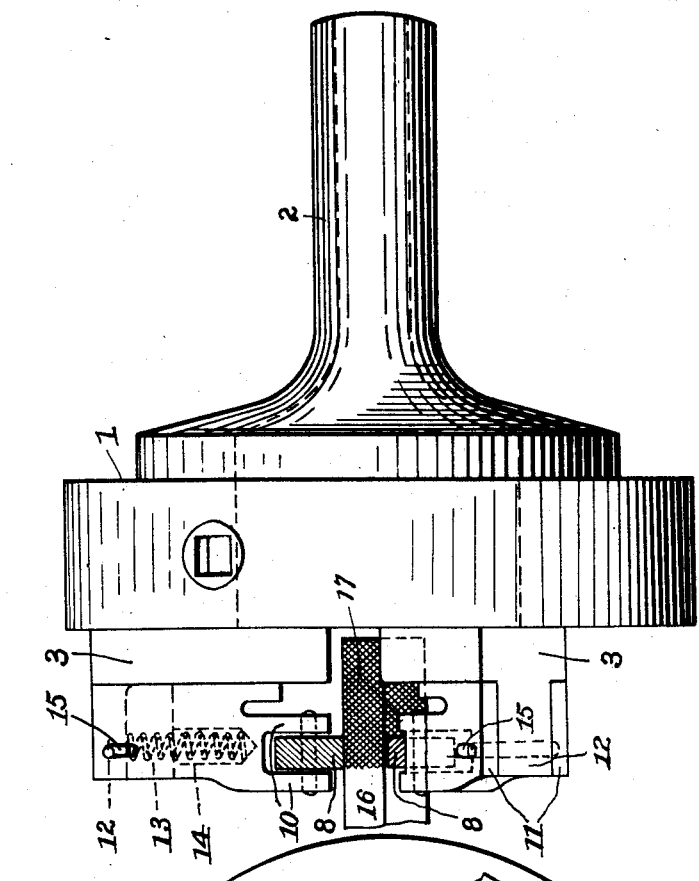
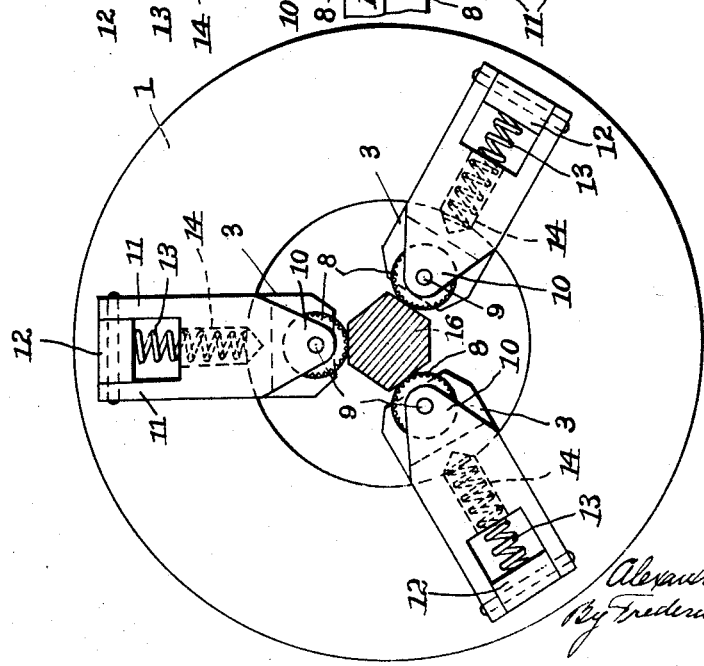
INVENTOR A. DJIDICS.
NURLING-DEVICE.
APPLICATION FILED NOV. 8, 1919.
1,365,386.
Patented Jan. 11, 1921.
2 SHEETS—SHEET 2.
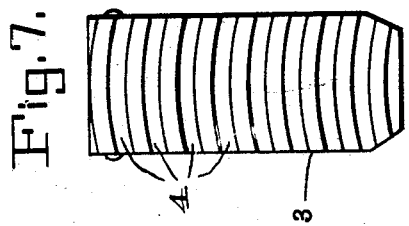
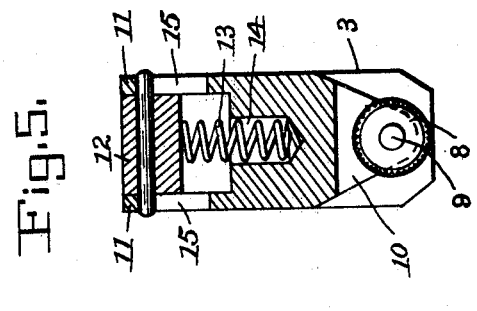
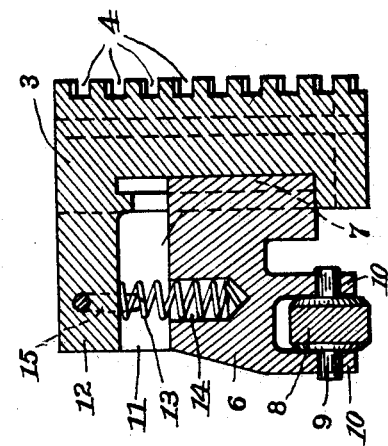
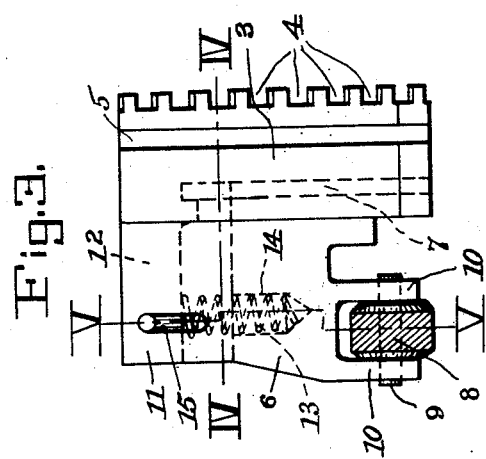
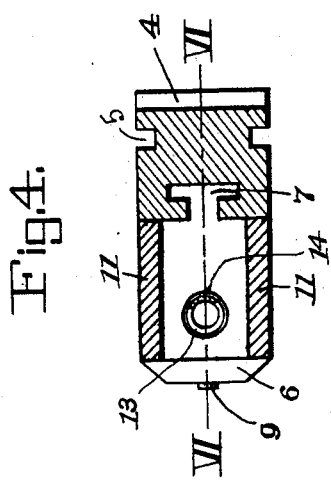
INVENTOR
Alexander Djidics
By Frederick W. Winters
Attorney

UNITED STATES PATENT OFFICE.

ALEXANDER DJIDICS, OF NEW YORK, N. Y.

NURLING DEVICE.

1,365,386.  Specification of Letters Patent.  Patented Jan. 11, 1921.

Application filed November 8, 1919. Serial No. 336,649.

*To all whom it may concern:*

Be it known that I, ALEXANDER DJIDICS, a citizen of Serbia, residing at New York, in the county and State of New York, have invented certain new and useful Improvements in Nurling Devices, of which the following is a full, clear, and exact specification.

This invention relates to a device for nurling bars or other articles, and has for its object to produce an appliance of this kind which may be used in a lathe or turning machine and which is adapted for nurling bars or articles which are angular or round or irregular in cross section. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a front elevation of a nurling device constructed substantially in accordance with this invention.

Fig. 2 is a side elevation of the same, showing a partially nurled rod engaged thereby as also in Fig. 1.

Fig. 3 is a detailed side view of one of the adjustable chuck members carrying one of the spring pressed and automatically yielding nurling tools.

Fig. 4 is a section on the line IV—IV of Fig. 3.

Fig. 5 is a section on the line V—V of the same figure.

Fig. 6 is a section through the chuck member and tool on the line VI—VI of Fig. 4, and Fig. 7 is an inner edge view of one of said chuck members.

In Figs. 1 and 2 of the drawings, 1 designates a rotary chuck head having a centrally extending shank 2 to fit in the rotating head of a lathe (not shown) so as to be rotated thereby during the nurling operation. The chuck is shown as provided with three radially movable members or jaws 3 which are mortised in the head 1 in the usual manner of chucks of this type, each jaw having lateral grooves 5 to slide on corresponding ledges (not shown) on the walls of the cavity in which said jaw works. It will also be understood that the jaws 3 are adapted to be simultaneously moved radially toward or away from the center of the chuck head by a spiral gear (not shown) which is inclosed in the head and engages segmental gear teeth 4 on the inner edges of said jaws, in the usual manner.

Each jaw 3 carries an independently movable nurling tool comprising a block 6 mounted to slide radially on said jaw by reason of a T-shaped tongue 7 fitting in a correspondingly shaped groove in the jaw, and a nurling wheel 8 mounted on a shaft 9 between arms 10. Each tool or block has lateral arms 11 extending outwardly at opposite sides of a lug 12 projecting from the outer portion of jaw, and a coiled spring 13 is interposed between said lug and block for yieldingly pressing the nurling wheel into engagement with the work. Said spring is seated in a cavity 14 in the block 6 and is entirely out of the way. The radial movement of the block on the jaw member is limited by a cross pin on the lug 12 extending into slots 15 in the arms 11.

In operation, the jaws carrying the nurling tools are first adjusted through the medium of the segmental gear teeth 5 as already explained so as to bring all of said nurling wheels 8 into position to engage the shortest diameter of the piece of work. As shown in Figs. 1 and 2, the work may be a rod 16 which is hexagonal in cross section, in which case the nurling wheels are initially adjusted to engage the flat sides of the rod, as shown in Fig. 1. Then when the chuck head is rotated in a lathe and the work or rod 16 is held against turning in any suitable manner, the blocks or tools carrying the wheels 8 will automatically yield against the springs 13 in riding over the corners or edges of the rod. In this way an even and continuous nurled surface 17, Fig. 2, may be readily formed on the rod or work so as to uniformly cover any irregularities in its conformation.

Having thus described my invention, what I claim as new and desire to secure by Letters Patent of the United States is:—

1. The combination with a rotatable head, of jaws radially movable thereon, and nurling tools independently and yieldingly mounted to slide radially on said jaws.

2. The combination with a rotatable head, of jaws radially adjustable thereon and having outwardly extending lugs, nurling tools independently mounted to slide radially on said jaws, said tools having arms embracing said lugs and provided with slots, springs interposed between said tools and lugs, and pins projecting from the lugs into said slots to limit the movement of the tools.

3. The combination with a rotatable head, of jaws radially adjustable thereon and having outwardly extending lugs, blocks independently mounted to slide radially on said jaws, nurling wheels journaled on the inner ends of said blocks, and springs interposed between said lugs and blocks for yieldingly holding said wheels in engagement with the work.

4. The combination with a rotatable head, of jaws radially adjustable thereon and having outwardly extending lugs, nurling tools independently mounted to slide radially on said jaws, springs interposed between said tools and lugs, there being cavities in one of said parts to house the springs, and means for limiting the movement of said tools on the jaws.

In testimony whereof I have signed my name to this specification.

ALEXANDER DJIDICS.